US012576454B2

(12) United States Patent
 Bocksrocker et al.

(10) Patent No.: US 12,576,454 B2
(45) Date of Patent: Mar. 17, 2026

(54) LASER SOLDERING FOR STEEL BODYWORK PARTS

(71) Applicant: TRUMPF Laser—und Systemtechnik GmbH, Ditzingen (DE)

(72) Inventors: Oliver Bocksrocker, Sachsenheim (DE); Nicolai Speker, Pleidelsheim (DE); Tim Hesse, Ditzingen (DE)

(73) Assignee: TRUMPF LASER—UND SYSTEMTECHNIK GMBH, Ditzingen (DE)

( * ) Notice: Subject to any disclaimer, the term of this patent is extended or adjusted under 35 U.S.C. 154(b) by 752 days.

(21) Appl. No.: 17/697,958

(22) Filed: Mar. 18, 2022

(65) Prior Publication Data

US 2022/0203470 A1 Jun. 30, 2022

Related U.S. Application Data

(63) Continuation of application No. PCT/EP2020/076107, filed on Sep. 18, 2020.

(30) Foreign Application Priority Data

Sep. 27, 2019 (DE) ..................... 10 2019 214 891.3

(51) Int. Cl.
 B23K 1/005 (2006.01)
 B23K 1/14 (2006.01)
 (Continued)

(52) U.S. Cl.
 CPC .............. B23K 1/0056 (2013.01); B23K 1/14 (2013.01); B23K 1/19 (2013.01);
 (Continued)

(58) Field of Classification Search
 CPC .......... B23K 1/0056; B23K 1/14; B23K 1/19; B23K 2103/16; B23K 2101/006; B23K 2103/04
 (Continued)

(56) References Cited

U.S. PATENT DOCUMENTS

2006/0021681 A1 2/2006 Yamada et al.
2016/0332254 A1 11/2016 Kaiser
 (Continued)

FOREIGN PATENT DOCUMENTS

CN 1217248 A 5/1999
CN 105980100 A 9/2016
 (Continued)

OTHER PUBLICATIONS

Laserline, "Laserline Brazing with Triple Spot," YouTube, May 9, 2017, Laserline Inc., Santa Clara, CA, USA.
 (Continued)

*Primary Examiner* — Steven W Crabb
*Assistant Examiner* — Dilnessa B Belay
(74) *Attorney, Agent, or Firm* — LEYDIG VOIT & MAYER LTD.

(57) ABSTRACT

A method for laser soldering includes selecting a copper-containing material as a filler material, supplying the filler material at a butt joint of two components, and melting the filler material in a main process zone by means of laser radiation in an advancement direction. The filler material in the main process zone is melted by means of laser radiation of a wavelength λH in the blue or green spectral range with 400 nm≤λH≤600 nm.

14 Claims, 3 Drawing Sheets

(51) Int. Cl.

| | | |
|---|---|---|
| *B23K 1/19* | (2006.01) |
| *B23K 101/00* | (2006.01) |
| *B23K 103/04* | (2006.01) |
| *B23K 103/16* | (2006.01) |

(52) U.S. Cl.
CPC .... *B23K 2101/006* (2018.08); *B23K 2103/04* (2018.08); *B23K 2103/16* (2018.08)

(58) Field of Classification Search
USPC ........................................................ 219/212
See application file for complete search history.

(56) References Cited

U.S. PATENT DOCUMENTS

| | | | |
|---|---|---|---|
| 2017/0341144 A1 | 11/2017 | Pelaprat et al. | |
| 2018/0147661 A1* | 5/2018 | Salokatve | G02B 6/02042 |
| 2018/0236605 A1 | 8/2018 | Finuf et al. | |
| 2019/0061053 A1* | 2/2019 | Yang | B23K 26/244 |
| 2020/0030909 A1 | 1/2020 | Andreasch | |
| 2022/0281028 A1* | 9/2022 | Trube | B23K 20/106 |

FOREIGN PATENT DOCUMENTS

| | | | | |
|---|---|---|---|---|
| CN | 107598371 A | 1/2018 | | |
| CN | 108372362 A | 8/2018 | | |
| CN | 109014570 A | 12/2018 | | |
| CN | 109420812 A | 3/2019 | | |
| CN | 109530917 A | 3/2019 | | |
| CN | 109715339 A | 5/2019 | | |
| CN | 109789512 A | 5/2019 | | |
| DE | 19750586 A1 * | 5/1999 | .......... | B23K 1/0056 |
| DE | 102014213528 A1 | 8/2015 | | |
| DE | 102015112537 A1 | 1/2017 | | |
| DE | 102018001460 A1 | 8/2019 | | |
| EP | 3117950 A1 * | 1/2017 | ......... | B23K 26/0604 |

OTHER PUBLICATIONS

Heider, et al., "Stabilized Copper Welding by Using Power Modulated Green and IR Laser Beams," *Proceedings of ICALEO* 2011, Oct. 23-27, 2011, pp. 395-402, Laser Institute of America, Orlando, FL, USA.

Laserline, "Schneller Loeten in der Dachnaht," *Laserline GmbH,* Dec. 2015, pp. 1-2, Laserline GmbH, Muelheim-Kaerlich, Germany.

* cited by examiner

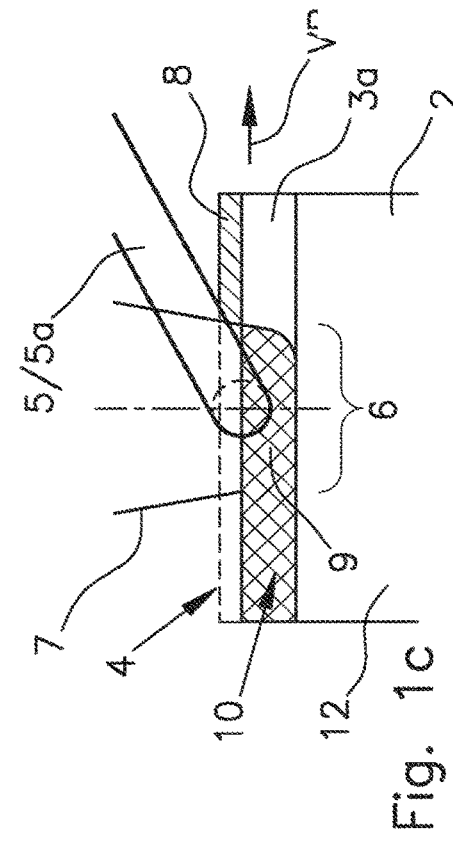
Fig. 1c
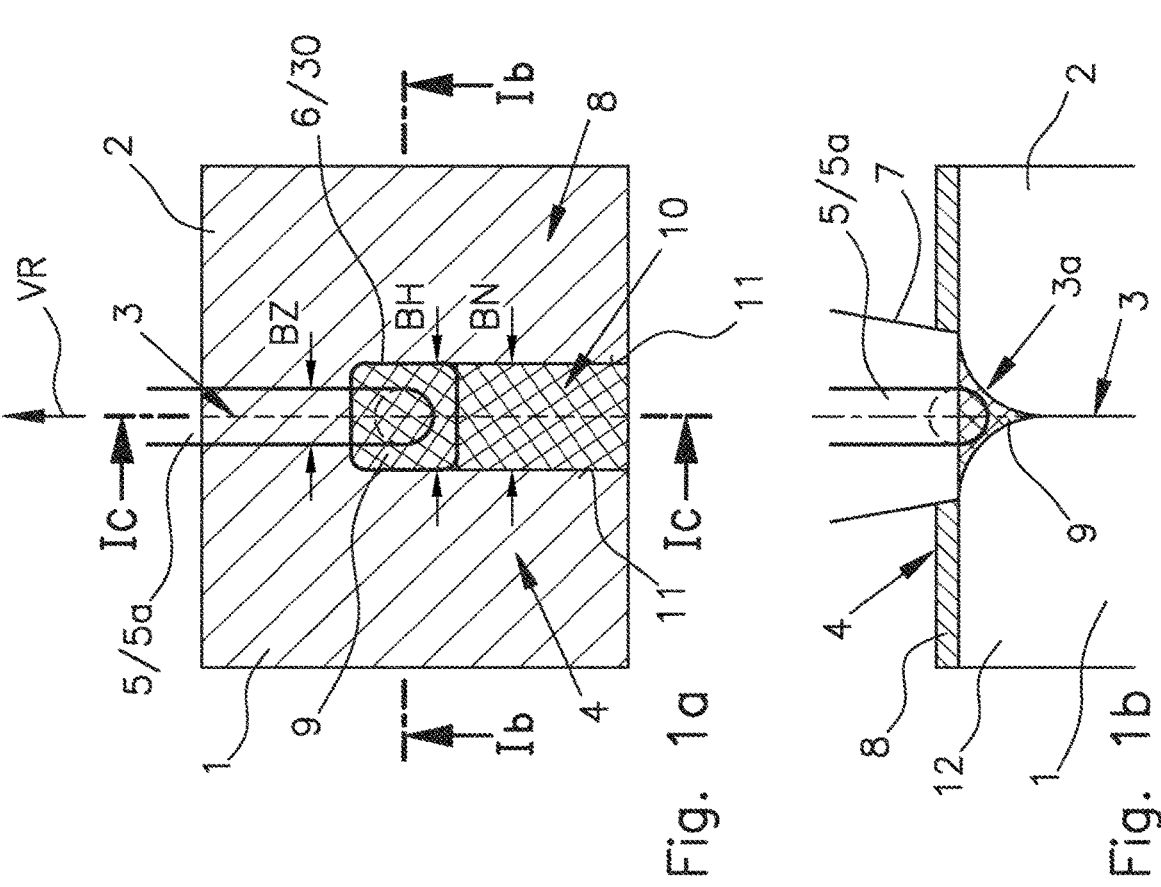
Fig. 1a
Fig. 1b

LASER SOLDERING FOR STEEL BODYWORK PARTS

CROSS REFERENCE TO RELATED APPLICATIONS

This application is a continuation of International Application No. PCT/EP2020/076107 (WO 2021/058392 A1), filed on Sep. 18, 2020, and claims benefit to German Patent Application No. DE 10 2019 214 891.3, filed on Sep. 27, 2019. The aforementioned applications are hereby incorporated by reference herein.

FIELD

Embodiments of the present invention relate to a method for laser soldering.

BACKGROUND

The company publication "Laserlöten mit Diodenlasern" [Laser soldering with diode lasers] from Laserline GmbH, Mühlheim-Kärlich, DE, retrieved from https://www.laser-line.com/de-int/laserloeten/ on Aug. 27, 2019 discusses a laser soldering method. Soldering is a method for joining components by material bonding. In this context, by means of a heat source a melt is created at the interface of two components to be joined, but the components are not melted at depth. In a type of soldering, a filler material (also referred to as filler substance or solder) is supplied at the butt joint of the components and is melted by a heat source. Depending on the soldering temperature, a distinction is made between soft soldering (below 450° C.) and hard soldering/brazing (above 450° C.). For hard soldering/brazing, copper-containing filler materials (solders) are known, cf. the German Wikipedia entry "Hartlöten" [hard soldering/brazing], retrieved on Jul. 19, 2019.

For the manufacture of bodywork components in the automotive field by means of hard soldering/brazing, the use of a diode laser as heat source is known, cf. DE 10 2015 112 537 A1. For a stable and smooth procedure, in this respect it is possible to use a beam-forming optical module, which creates from a laser beam a focus geometry having a main laser spot and at least one secondary laser spot.

The company publication referred to above, "Laserlöten mit Diodenlasern" [Laser soldering with diode lasers], discusses the hard soldering/brazing of zinc-coated steel sheets with a copper/silicon wire, which is melted by means of a diode laser. In this respect, a triple spot having a main spot and two preceding secondary spots can be used, the zinc coating being removed by means of the secondary spots at the edge of the solder wire. The associated method is also shown in the YouTube video "Laserlöten mit Triple Spot" [Laser soldering with triple spot], a link to which is given on the Internet page specified, retrieved from https://www.you-tube.com/watch?v=pWBNHzXKrOI on Aug. 27, 2019.

The diode lasers usually used in soldering have a wavelength in the near-infrared spectral range of around 800 nm to 1100 nm. These diode lasers can be obtained inexpensively. However, when joining bodywork components of sheet steel by means of laser soldering using copper-containing filler material, the procedure for obtaining a good solder seam quality is comparatively difficult. In addition, comparatively great laser power outputs are necessary.

The company publication "Laserline LDMblue Blaue Hochleistungsdiodenlaser" [Laserline LDMblue blue diode laser with high power output], Laserline GmbH, Mülheim- Kärlich, DE, 2019, has disclosed a diode laser having a laser radiation wavelength of approximately 450 nm. This diode laser is intended to allow a spatter-free welding process when processing copper and other non-ferrous metals, for instance when welding thin copper foils and copper sheets.

SUMMARY

In an embodiment, the present disclosure provides a method for laser soldering. The method includes selecting a copper-containing material as a filler material, supplying the filler material at a butt joint of two components, and melting the filler material in a main process zone by means of laser radiation in an advancement direction. The filler material in the main process zone is melted by means of laser radiation of a wavelength $\lambda H$ in the blue or green spectral range with 400 nm$\leq\lambda H\leq$600 nm.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 1a shows a schematic plan view of two components over the course of a first variant of a laser soldering method according to embodiments of the present invention, with the establishment of a main process zone;

FIG. 1b shows the components of FIG. 1a in a schematic cross section through plane Ib in FIG. 1a;

FIG. 1c shows the components of FIG. 1a in a schematic longitudinal section through plane Ic in FIG. 1a;

FIG. 2a shows a schematic plan view of two components over the course of a second variant of a laser soldering method according to embodiments of the present invention, with the establishment of a main process zone, an upstream process zone and two lateral process zones;

FIG. 2b shows the components of FIG. 2a in a schematic cross section through plane IIb in FIG. 2a;

FIG. 2c shows the components of FIG. 2a in a schematic longitudinal section through plane IIc in FIG. 2a;

DETAILED DESCRIPTION

Figures 2A, 2B, 2C:
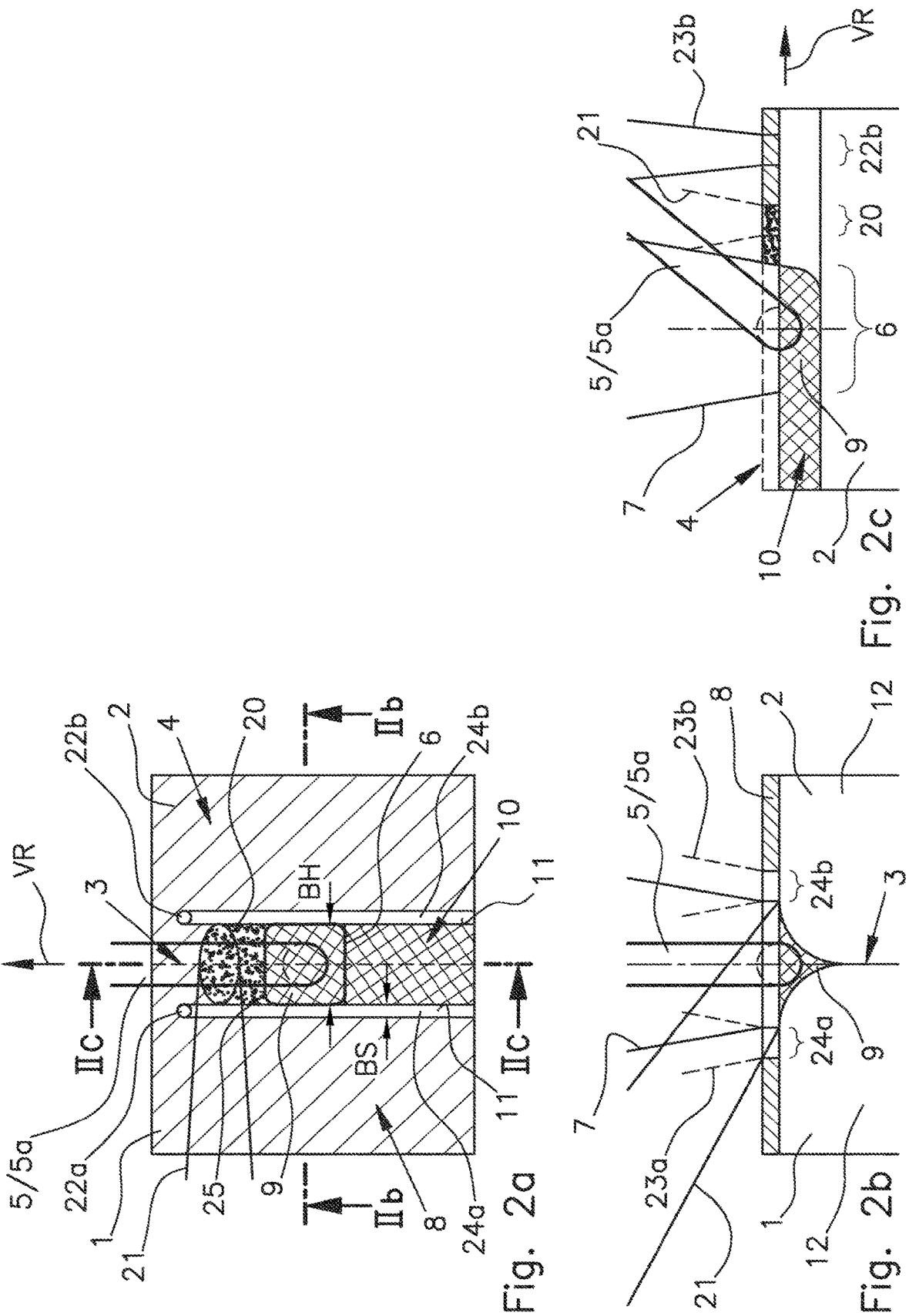

Embodiments of the present invention can obtain a better solder seam quality and improved process efficiency during the laser soldering of components using a copper-containing filler material.

Embodiments of the present invention provide a method in which the filler material in the main process zone is melted by means of laser radiation of a wavelength λH in the blue or green spectral range, in particular with 400 nm≤λH≤600 nm.

According to embodiments of the present invention, it has been found that the use of blue or green laser radiation in the main process zone can make it possible to improve the procedure during laser soldering, in particular hard soldering/brazing, using a copper-containing filler material (filler substance, solder). The melting of the filler material is subject (in comparison with the use of laser radiation in the near-infrared) to less process disruptions and can be carried out with a lower laser power output. In particular, it is possible to avoid or reduce the occurrence of spatters from the molten solder, and to eliminate or reduce waviness of the solder seam. The required laser power output can be reduced (in comparison with the use of laser radiation in the near-infrared), which increases the process efficiency in terms of energy and therefore saves costs. The molten solder is less dynamic, and an especially clean solder seam can be obtained.

In some embodiments, the wavelength λH of the laser radiation of the main process zone can be in the blue spectral range, e.g., 400 nm≤λH≤500 nm, or 400 nm≤λH≤460 nm, or 402 nm≤λH≤408 nm, or 442 nm≤λH≤448 nm. In some embodiments, the wavelength λH of the laser radiation of the main process zone can be in the green spectral range, e.g., 500 nm≤λH≤600 nm, or 512 nm≤λH≤518 nm, or λH=515 nm.

The blue or green laser radiation can be created by means of a diode laser. The diode laser may comprise an individual laser diode or multiple laser diodes (e.g., diode stacks).

In particular, the filler material may be a copper/silicon material. The copper proportion in the solder can absorb blue and green light to a significant extent, so that laser energy can be easily coupled into the filler material. The filler material can have a melting point of 450° C. or more, and therefore the laser soldering process is a hard soldering/brazing operation and can result in good mechanical strength of the solder seam. The filler material is melted by the laser radiation of the main process zone, which produces molten solder. In the course of the laser soldering process, the base material of the components is not melted, i.e. the method is carried out such that the melting temperature of the base material of the components is not reached. It should be noted, however, that coating material of the components in the main process zone can be melted; such a coating material may serve as a flux.

According to some embodiments, the (maximum) width BH of the main process zone is somewhat larger than the width BZ of the filler material supplied, measured transversely to the advancement direction, preferably with BH≥1.25*BZ or BH≥1.5*BZ. In some embodiments, the filler material is supplied in the form of a wire, but it is also possible to supply the filler material for example in the form of a strip, powder or paste (in the case of a powder or a paste, the width BZ of the filler material corresponds to the width over which the filler material is deposited onto the components in the region of the butt joint). Where the main process zone exceeds the filler material ("exceedance zone"), the laser radiation of the main process zone can melt the coating material on the components and/or facilitate wetting of the component surfaces with molten filler material or molten solder.

According to some embodiments, the method is carried out such that the width BH of the main process zone corresponds to the width BN of the later solder seam at the butt joint of the components, in each case measured transversely to the advancement direction.

In some embodiments, the filler material in the main process zone is melted by means of a rectangular focus of the laser radiation. Such a geometry makes it possible to obtain sharp lateral boundaries (edges) of the solder seam. In this respect, the rectangular focus is aligned with a pair of lateral edges parallel to the advancement direction. It should be noted that, in this embodiment, the rectangular focus of the laser radiation may be designed with roundings in the region of its corners, which makes it possible to minimize process disruptions. In some embodiments, the following holds true for the radius of curvature KR in the region of the corners compared with the length LKK of the rectangular focus along the shortest main axis (length of the shortest edge): 0.033*LKK≤KR≤0.33*LKK.

In another embodiment, the rectangular focus can have a length along a large main axis and a width along a small main axis, and the length is greater than the width. It can be advantageous that the large main axis of the rectangular focus is oriented in the advancement direction. This makes it possible to distribute the laser energy over a larger surface area even in the case of narrow solder seams, as a result of which a smooth molten solder can be obtained. In some embodiments, an aspect ratio AV (ratio of the edge length of the rectangular focus along the large main axis to the width of the rectangular focus along the small main axis) can amount to 1.5 or more, preferably 2 or more, or preferably 2.5 or more.

In another embodiment, the laser radiation in the main process zone has a square focus, wherein a width BH of the main process zone with the square focus corresponds to a seam width BN of a manufactured solder seam at the butt joint of the components, in each case measured transversely to the advancement direction. In this embodiment, the aspect ratio can amount to AV=1. The creation of a square focus is comparatively simple and can limit temperature gradients in the molten solder. The square focus of the main process zone has proven successful when manufacturing a solder seam with BH=BN.

In some embodiments, the main process zone has a width BH transversely to the advancement direction, with $$1.5*BZ≤BH≤2.5*BZ,$$

or $1.8*BZ≤BH≤2.2*BZ,$ in which BZ: is the width of the filler material transversely to the advancement direction. Where the main process zone exceeds the filler material ("exceedance zone"), the laser radiation of the main process zone can melt a coating material on the components and/or facilitate wetting of the component surfaces with molten filler material or molten solder. In this context, in the range provided of the ratios of BZ and BH, a good input of coating material (flux) can be achieved, and at the same time the solder seam can be prevented from going too far to the side, which in many usage situations could adversely affect the mechanical strength.

In yet another embodiment, at least in the main process zone, laser radiation with a higher power output density in a core region and a lower power output density in a ring region surrounding the core region is used, in particular the laser radiation of the main process zone being created by means of a multiclad fiber or a diffractive optical element. The laser radiation of the main process zone has a double top hat profile, with a substantially constant (high) laser power output in the core region and a substantially constant (lower)

laser power output in the ring region. The reduced laser power output in the ring region can contribute to keeping the dynamics of the molten solder low. In addition, in many joint geometries, it is possible to reduce the input of heat into the base material of the components, thereby reducing the risk of partial melting of the base material of the components (and therefore contamination of the molten solder).

In some embodiments, the two components are formed with a base material and a coating material arranged on the base material. The components can face one another by way of the sides on which the coating material is arranged, or the sides on which the coating material is arranged are both aligned toward the laser radiation source. In the laser soldering process, the coating material can be used as a flux, and for this purpose is locally melted. The base material, however, is not melted in the course of the laser soldering process.

Some embodiments provide that the base material comprises steel, for example sheet steel, and/or the coating material comprises zinc. This combination of materials can be useful in the construction of vehicle bodywork and can be soldered with high quality and high mechanical strength, to a copper-containing filler material (solder). The sheet steel may be hot galvanized.

In an embodiment, the coating material in the region of the butt joint is melted by means of laser radiation in an upstream process zone, which is upstream of the main process zone with respect to the advancement direction. The upstream process zone makes it possible to improve the provision of flux (coating material), in particular at a front of the molten solder. Since the filler material is generally supplied "from the front" of the molten solder with respect to the advancement direction, the upstream process zone is generally located below a region over which the filler material is supplied, for instance below a filler wire or below a supply device for the filler material. A laser that is radiated from above, as is usually used for the main process zone, on account of shadowing below this region may not melt the coating material directly upstream of the front of the molten solder. The laser radiation for the upstream process zone is therefore generally supplied from an oblique direction (or also multiple, typically mutually symmetrically aligned, oblique directions), for instance from the side of the butt joint, in order to avoid shadowing caused by the filler material to be supplied or its supply device. The laser radiation in the upstream process zone can be created by means of a diode laser; the wavelength $\lambda V$ of the laser radiation of the upstream process zone can be selected irrespective of the wavelength $\lambda H$ of the laser radiation of the main process zone. In some embodiment, the wavelength $\lambda V$ of the upstream process zone may be selected to be in the blue spectral range (400-500 nm) or green spectral range (500-600 nm) or else in the near-infrared spectral range (800-1100 nm). In some embodiments, the wavelength $\lambda V$ of the upstream process zone is selected to be different than the wavelength $\lambda H$ of the main process zone and/or is created by means of a different laser. The upstream process zone can be separate (separated in the advancement direction) from the main process zone, but may also directly adjoin the main process zone.

In some embodiments, it is provided that, in two lateral process zones located upstream of the main process zone and to either side of the butt joint of the two components with respect to the advancement direction, the coating material is evaporated by means of laser radiation, with the result that two tracks that are separate from one another and freed of coating material are produced on the two components. The tracks that are freed of flux act as a barrier for the flow of the molten solder and thus define and delimit the width of the solder seam obtained. Thus, it is possible to obtain a laterally sharply delimited solder seam. The laser radiation in the lateral process zones may be created by means of a diode laser.

In an embodiment, the coating material in the two lateral process zones is evaporated by means of laser radiation of a wavelength $\lambda S$. The wavelength $\lambda H$ of the laser radiation of the main process zone and the wavelength $\lambda S$ of the laser radiation of the lateral process zones can be selected to be different. The wavelengths $\lambda H$ and $\lambda S$ can therefore be individually adapted to the filler material and the coating material and optimized in terms of the absorption behavior and the beam quality or power output density. The wavelength in the blue or green spectral range that is intended for melting the copper-containing filler material may not be necessary for the evaporation of the coating material; by contrast, a high beam quality, which is not necessary for melting the filler material, is advantageous for the evaporation of the coating material with a defined edge of a track obtained that is freed of coating material.

In this respect, the wavelength $\lambda S$ of the laser radiation in the lateral process zones can be selected to be in the near-infrared spectral range, in particular with 800 nm$\leq \lambda S \leq$1100 nm. Corresponding diode lasers are inexpensive and are commercially available with a high beam quality.

In an embodiment, the laser radiation in the lateral process zones is created by means of a laser which has a higher beam quality than a laser which creates the laser radiation of the main process zone. This makes it possible to obtain a particularly sharply delimited solder seam. The beam quality may be matched over the beam parameter product.

In an embodiment, it is provided that the lateral process zones have widths BS transversely to the advancement direction, with $$BS \leq 0.5 * BH,$$

$$\text{or } BS \leq 0.33 * BH,$$

in which BH: is the width of the main process zone transversely to the advancement direction. Correspondingly small widths BS of the lateral process zones are sufficient for reliable delimitation of the flow of the molten solder or for delimitation of the solder seam. Small widths BS make it possible to carry out the soldering process in an energy-saving manner.

The method according to embodiments of the present invention can be used for joining bodywork components, in particular steel bodywork components, of vehicles, in particular motor vehicles. The bodywork components can be joined energy-efficiently in a comparatively simple process with high quality and high mechanical strength.

FIG. 1$a$ illustrates a schematic plan view, FIG. 1$b$ illustrates a schematic cross section perpendicular to the course of the solder seam in the region of the main process zone, and FIG. 1$c$ illustrates a schematic longitudinal section along the solder seam and/or the butt joint, according to some embodiments of the present invention for the laser soldering of components. The sectional planes of FIG. 1$b$ and FIG. 1$c$ are indicated in FIG. 1$a$ with the plane designations Ib and Ic.

A first component 1 and a second component 2 are arranged lying against one another in the region of a butt joint 3 and are to be soldered to one another. In this instance, the components 1, 2 are manufactured from sheet steel and are part of a bodywork for a vehicle (the latter is not illustrated in more detail). In the example shown, the soldering process takes place from a top side 4 of the components 1, 2. In the region of the top side 4, on account of the rounding of the edges of the components 1, 2 there, the butt joint 3 forms a trough 3a to be filled with solder. The components 1, 2 are in this example coated on the top side 4 and in the region of the trough 3a with a coating material 8 (illustrated simply by hatching); additionally it is also possible to provide coating material in the butt joint 3 or the contact surface of the components 1, 2 (this is not illustrated). The coating material 8 in this example contains zinc, for example with a proportion of at least 20% by weight, and serves as a flux for the soldering process.

The method provides the supply of a filler material 5, here in the form of a filler wire 5a. The filler material 5 contains copper, for example with a proportion of at least 20% by weight. It should be noted that the filler material 5 is represented as transparent in FIGS. 1a-1c, in order to make the underlying structures more clearly visible. In a main process zone 6, through which the butt joint 3 runs centrally and which in this instance is formed by means of a square focus 30, the filler material 5 is melted by means of laser radiation 7. In the process, in the course of the method the main process zone 6 proceeds relative to the components 1, 2 in an advancement direction VR, which runs along the butt joint 3. It should be noted that for this purpose, for example, the components 1, 2 can be moved with respect to a stationary soldering unit (not illustrated in more detail), or else the soldering unit can be moved with respect to stationary components 1, 2, or both the components 1, 2 and the soldering unit can be moved at the same time in a suitably synchronized manner.

The laser radiation 7 of the main process zone 6 is created by means of a diode laser (not illustrated in more detail) and in this example has a wavelength of approximately 450 nm, and is thus in the blue spectral range. This makes it possible for the laser radiation 7 to be absorbed energy efficiently by the copper-containing filler material 5. In the region of the main process zone 6, molten solder 9 (illustrated by cross-hatching) forms, which contains molten filler material 5 and also molten coating material 8 (flux). The molten solder 9 resolidifies downstream of the main process zone 6 with respect to the advancement direction VR (the solidification front is not illustrated in more detail for simplification purposes). As a result, downstream of the main process zone 6 there forms a solder seam 10 (likewise illustrated by cross-hatching), the width BN of which here corresponds to the width BH of the main process zone 6, in each case measured transversely to the advancement direction VR.

The method allows a comparatively low degree of dynamics of the molten solder 9, with the result that comparatively sharp edges 11 of the solder seam 10 can be obtained and process disruptions such as spatter or waviness of the solder seam 10 can be minimized.

The filler material 5 or the filler wire 5a are in this instance supplied obliquely in front with respect to the advancement direction VR. It should be noted that the supply speed of the filler wire 5a here can deviate from the advancement speed of the soldering process (i.e. from the relative speed of the components and the main process zone). The laser radiation 7 of the main process zone 6 is radiated here from above approximately perpendicularly to the top side 4 of the components 1, 2.

The width BH of the main process zone 6, measured transversely (perpendicularly) to the advancement direction VR, is in this instance approximately twice as large as the width BZ of the filler wire 5a. Where the main process zone 6 or the laser radiation 7 exceeds the filler wire 5a, it is possible for the coating material 8 to be melted in this "exceedance zone". However, it should be noted that the base material 12 (in this instance steel) of the components 1, 2 to which the coating material 8 is applied is not melted in the course of the soldering process.

FIG. 2a illustrates a schematic plan view, FIG. 2b illustrates a schematic cross section perpendicular to the course of the solder seam in the region of the main process zone, and FIG. 2c illustrates a schematic longitudinal section along the solder seam or the butt joint, according to some embodiments of the present invention for the laser soldering of components. The sectional planes of FIG. 2b and FIG. 2c are indicated in FIG. 2a with the plane designations IIb and IIc. Only the significant differences in relation to the method of FIGS. 1a-1c will be explained.

In this embodiment, laser radiation 7 is used in the main process zone 6, laser radiation 21 is used in an upstream process zone 20, and laser radiation 23a, 23b is used in two lateral process zones 22a, 22b. All of these process zones 6, 20, 22a, 22b move together in the advancement direction VR relative to the components 1, 2 to be soldered together (to be joined).

The lateral process zones 22a, 22b lie upstream of the main process zone 6 and furthermore on either side of the main process zone 6 with respect to the advancement direction VR. The associated laser radiation 23a, 23b of the lateral process zones 22a, 22b has a high power output density and evaporates the coating material 8 on the top side 4 of the components 1, 2. As a result, the lateral process zones 22a, 22b leave behind tracks 24a, 24b, freed of coating material 8, on the top side 4 of the components 1, 2; the base material 12 on the top side 4 is therefore exposed at the tracks 24a, 24b. These tracks 24a, 24b are virtually not wetted by the molten solder 9, as a result of which the edges 11 of the solder seam 10 can have a sharp form. The inner spacing between the lateral process zones 22a, 22b corresponds to the width BH of the main process zone 6. The width BS of the lateral process zones here can amount to in each case ⅓ of the width BH of the main process zones, that is to say BS=0.33*BH.

With respect to the advancement direction VR, the upstream process zone 20 likewise lies upstream of the main process zone 6 (but somewhat closer to the main process zone 6 than the lateral process zones 22a, 22b) and has the butt joint 3 running centrally through it. The upstream process zone 20 lies on the top side 4 of the components 1, 2 below the copper-containing filler wire 5a, with the result that the upstream process zone 20 cannot be irradiated from above with laser radiation; the laser radiation 21 of the upstream process zone 20 is therefore directed onto the component surface on the top side 4 from the side, here from the side of the first component 1 (from the left in FIG. 2a) below the filler wire 5a. In the upstream process zone 20, the coating material 8 is merely melted; the molten coating material is represented by a dashed line. As a result, flux (molten coating material) is also made available at a front 25 of the main process zone 6, thereby improving the soldering process. The width of the upstream process zone corresponds here to the width BH of the main process zone 6, measured transversely to the advancement direction VR.

In this example, the wavelength λS of the laser radiation 23a, 23b of the lateral process zones 22a, 22b is selected to be 1030 nm and is therefore in the near-infrared. It is created by means of a second diode laser (not illustrated in more detail), which has a better beam quality than the first diode laser for the laser radiation 7 of the main process zone 6. To create the two lateral process zones 22a, 22b, an original laser beam can be split, for instance by means of a beam splitter.

In this instance, the wavelength $\lambda V$ of the laser radiation 21 of the upstream process zone 20 is likewise selected to be 1030 nm and is therefore also in the near-infrared. It is created by means of a third diode laser.

The wavelength $\lambda H$ of the laser beam 7 of the main process zone 6 is in turn in the blue spectral range at approximately 450 nm.

Figure 3:
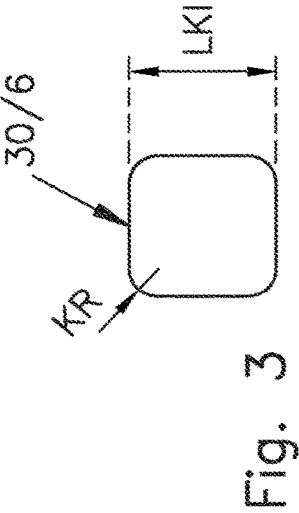
FIG. 3 shows a schematic plan view of a main process zone with a square focus of the laser radiation according to embodiments of the present invention.

FIG. 3 illustrates a rectangular, in this example square, focus 30 of the laser radiation of a main process zone 6, as can be used in the method according to embodiments of the present invention. The square focus 30 has four edges, which converge in a slightly rounded manner at four corners. The radius of curvature KR at the edges here can amount to approximately 0.2 times the length LKK of the shortest edge of the focus 30, all edge lengths being the same in the case of the square focus 30.

Figure 4:
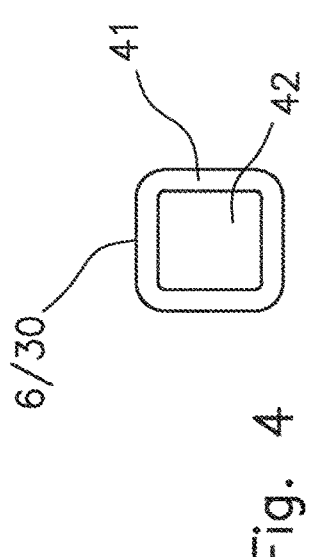
FIG. 4 shows a schematic plan view of a main process zone with a square focus of the laser radiation, having a core region and a ring region, according to embodiments of the present invention.

FIG. 4 likewise illustrates a square focus 30 of the laser radiation of a main process zone 6 according to some embodiments. The focus 30 here has a square core region 42, which is surrounded by a ring region 41 in a ring-shaped manner. The power output density of the laser radiation has a first, approximately constant value in the ring region 41, and a second, approximately constant value in the core region 42, the first value being smaller than the second value, for example by a factor of two or more.

Figure 5:
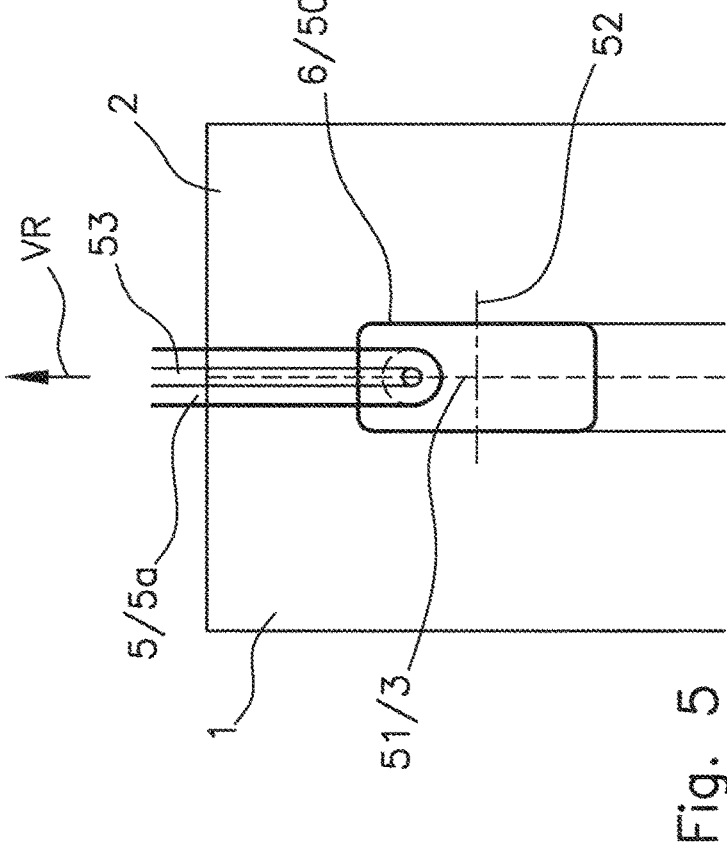
FIG. 5 shows a schematic plan view of two components over the course of a third variant of a laser soldering method, with the establishment of a main process zone having a rectangular focus aligned in the advancement direction, according to embodiments of the present invention.

FIG. 5 illustrates a schematic plan view of a method according to some embodiments the present invention for soldering two components 1, 2. In turn, only the differences in relation to the method of FIGS. 1a-1c will be explained.

The main process zone 6 is in this instance formed by means of a rectangular focus 50, the large main axis 51 of the focus 50 being aligned along the butt joint 3 and/or parallel to the advancement direction VR. The small main axis 52 lies transversely to the advancement direction VR. The rectangular focus 50 here has an aspect ratio AV, that is to say a ratio of the length of the focus 50 along the large main axis 51 and that along the small main axis 52 of approximately AV=2.

Furthermore, the components 1, 2 are not coated with a coating material here. Instead, in this example a flux is integrated in the filler material 5 or the filler wire 5b, here in the form of a filling 53 in a core of the filler wire 5b.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Component
2 Component
3 Butt joint
3a Trough
4 Top side
5 Filler material
5a Filler wire
5b Filler wire (with filling in the core)
6 Main process zone
7 Laser radiation (main process zone)
8 Coating material
9 Molten solder
10 Solder seam
11 Edge
12 Base material
20 Upstream process zone
21 Laser radiation (upstream process zone)
22a Lateral process zone
22b Lateral process zone
23a Laser radiation (lateral process zone)
23b Laser radiation (lateral process zone)
24a Track
24b Track
25 Front
30 Square focus
41 Ring region
42 Core region
50 Rectangular focus
51 Large main axis
52 Small main axis
53 Filling
BH Width of the main process zone
BN Width of the solder seam
BZ Width of the filler material/filler wire
KR Radius of curvature (at the corner of a focus)
LKK Length of shortest edge
VR Advancement direction

The invention claimed is:

1. A method for laser soldering, the method comprising, selecting a copper-containing material as a filler material, supplying the filler material at a butt joint of two components, and melting the filler material in a main process zone by laser radiation in an advancement direction,
 wherein
 the filler material in the main process zone is melted by the laser radiation of a wavelength $\lambda H$ in a blue spectral range,
 with 400 nm$\leq\lambda H\leq$500 nm,
 at least in the main process zone, the laser radiation with a higher power output density in a rectangular core region and a lower power output density in a ring region surrounding the core region is used,
 wherein the rectangular core region has a length along a large main axis and a width along a small main axis, the length being greater than the width, and wherein the large main axis of the rectangular focus is oriented in the advancement direction, and wherein the laser radiation of the main process zone is created by using a multiclad fiber or a diffractive optical element.

2. The method as claimed in claim 1, wherein the main process zone has a width BH transversely to the advancement direction, with $$1.5*BZ \leq BH \leq 2.5*BZ,$$

wherein BZ is a width of the filler material transversely to the advancement direction.

3. The method as claimed in claim 1, wherein the two components are formed with a base material and a coating material arranged on the base material.

4. The method as claimed in claim 3, wherein the base material comprises steel.

5. The method as claimed in claim 4, wherein the base material comprises sheet steel.

6. The method as claimed in claim 3, wherein the coating material comprises zinc.

7. The method as claimed in claim 3, wherein the coating material in a region of the butt joint is melted by second laser radiation in an upstream process zone, which is upstream of the main process zone with respect to the advancement direction.

8. The method as claimed in claim 3, wherein, in two lateral process zones located upstream of the main process zone and to either side of the butt joint of the two components with respect to the advancement direction, the coating material is evaporated by second laser radiation, with a result that two tracks that are separate from one another and freed of coating material are produced on the two components.

9. The method as claimed in claim 8, wherein the coating material in the two lateral process zones is evaporated by the second laser radiation of a wavelength $\lambda S$, the wavelength $\lambda H$ of the laser radiation of the main process zone and the wavelength $\lambda S$ of the second laser radiation of the lateral process zones being selected to be different.

10. The method as claimed in claim 9, wherein the wavelength $\lambda S$ of the second laser radiation in the lateral process zones is selected to be in a near-infrared spectral range, with 800 nm$\leq \lambda S \leq$1100 nm.

11. The method as claimed in claim 8, wherein the second laser radiation in the lateral process zones is created by a first laser which has a higher beam quality than that of a second laser which creates the laser radiation of the main process zone.

12. The method as claimed in claim 8, wherein the lateral process zones have a width BS transversely to the advancement direction, with $$BS \leq 0.5*BH,$$

wherein BH is a width of the main process zone transversely to the advancement direction.

13. The method as claimed in claim 1, wherein the filler material comprises a filler wire.

14. A use of a method as claimed in claim 1 for joining steel bodywork components of vehicles.

\* \* \* \* \*